(12) United States Patent
Maresca

(10) Patent No.: US 12,319,185 B2
(45) Date of Patent: Jun. 3, 2025

(54) CAR SEAT COVER PROVIDED WITH VIBRATING WARNING SYSTEM FOR SIGNALING DIRECTION INDICATORS

(71) Applicant: Vincenzo Maresca, Terracina (IT)

(72) Inventor: Vincenzo Maresca, Terracina (IT)

(73) Assignee: Vincenzo Maresca, Terracina (IT)

( * ) Notice: Subject to any disclaimer, the term of this patent is extended or adjusted under 35 U.S.C. 154(b) by 0 days.

(21) Appl. No.: 18/284,521

(22) PCT Filed: Mar. 25, 2022

(86) PCT No.: PCT/IB2022/052740
§ 371 (c)(1),
(2) Date: Sep. 27, 2023

(87) PCT Pub. No.: WO2022/208255
PCT Pub. Date: Oct. 6, 2022

(65) Prior Publication Data
US 2024/0181947 A1 Jun. 6, 2024

(30) Foreign Application Priority Data

Apr. 2, 2021 (IT) ........................ 102021000008390

(51) Int. Cl.
*G08B 21/00* (2006.01)
*B60N 2/00* (2006.01)
(Continued)

(52) U.S. Cl.
CPC ............... *B60N 2/90* (2018.02); *B60N 2/002* (2013.01); *B60N 2/0034* (2023.08); *B60N 2/976* (2018.02);
(Continued)

(58) Field of Classification Search
CPC ........ B60N 2/90; B60N 2/002; B60N 2/0034; B60N 2/976; B60N 2002/981;
(Continued)

(56) References Cited

U.S. PATENT DOCUMENTS

| 6,091,321 A * | 7/2000 | Karell ...................... B60Q 1/34 340/459 |
| 11,052,924 B2 | 7/2021 | Van Abbema |

(Continued)

FOREIGN PATENT DOCUMENTS

| EP | 3439912 A1 | 2/2019 |
| EP | 3439912 | 8/2019 |

OTHER PUBLICATIONS

European Patent Office, International Search Report issued in PCT/IB2022/052740, mailed Sep. 8, 2022, Rijswijk, NL.
(Continued)

*Primary Examiner* — Mark S Rushing
(74) *Attorney, Agent, or Firm* — Ferguson Case Orr Paterson

(57) ABSTRACT

A car seat cover device provided with a vibrating warning system for signaling a condition of direction indicators has a seat cover, a support base, a plurality of flat bases on right and left sides of the support base, each one provided with at least one vibrating motor, and an electronic control unit provided with a connector for connecting the electronic control unit to a car control gearcase, and configured to receive by the car control gearcase a signal relating to the condition of the direction indicators, and to operate as a function of the signal the vibrating motors associated to the flat bases arranged on a same side as an active direction indicator. A plurality of pressure sensors connected to the electronic unit is provided at a perimeter of the support base, each one configured to transmit a signal indicating presence (Continued)

or not of weight of a driver on a corresponding position of the seat cover.

7 Claims, 1 Drawing Sheet

(51) Int. Cl.
  *B60N 2/90* (2018.01)
  *B60Q 9/00* (2006.01)
(52) U.S. Cl.
  CPC .......... *B60Q 9/00* (2013.01); *B60N 2002/981* (2018.02); *B60N 2210/40* (2023.08)
(58) Field of Classification Search
  CPC .............. B60N 2210/40; B60N 2/0027; B60N 2/5685; B60N 2/6063; B60Q 9/00; F21W 2103/20
  USPC ........................................................ 340/439
  See application file for complete search history.

(56) References Cited

U.S. PATENT DOCUMENTS

| | | | |
|---|---|---|---|
| 2006/0044130 A1* | 3/2006 | Danowski | B60Q 1/34 340/407.1 |
| 2008/0128190 A1* | 6/2008 | Tsutsumi | B62J 1/28 180/219 |
| 2018/0161537 A1* | 6/2018 | Ketels | B60N 2/99 |
| 2019/0111946 A1* | 4/2019 | Van Abbema | B60N 2/70 |

OTHER PUBLICATIONS

European Patent Office, International Written Opinion issued in PCT/IB2022/052740, mailed Sep. 8, 2022.

* cited by examiner

CAR SEAT COVER PROVIDED WITH VIBRATING WARNING SYSTEM FOR SIGNALING DIRECTION INDICATORS

CROSS-REFERENCE TO RELATED APPLICATIONS

This application is a National Phase Application of PCT International Application No. PCT/IB2022/052740, having an International Filing Date of Mar. 25, 2022 which claims the benefit of priority to Italian Patent Application No. 102021000008390, filed Apr. 2, 2021, each of which is hereby incorporated by reference in its entirety.

FIELD OF THE INVENTION

The present invention relates to the technical field comprising devices used in the automotive vehicle field to warn the driver about their functioning condition to make driving safer.

In particular, the present invention relates to a r seat cover device provided with vibrating warning system for signaling direction indicators. The present invention aims at developing a control system of the direction indicator operating to be coupled with the classic warning light and the classic sound indicating that the direction indicator is on.

BACKGROUND OF THE INVENTION

The direction indicator, commonly known as indicator or direction indicator lamp, is a terminal of the signaling device, a vehicle is provided with, whose main function is to signal to others preventively that the driving direction of the vehicle is changing.

The technical problem arises from the fact that the driver very often forgets that the direction indicator is on, thus compromising the vehicle driving safety since he indicates a direction change that is not really going to happen. This situation can clearly lead to an accident, since by wrongly interpreting a vehicle direction change, which is not going to happen instead, the other vehicles can carry out maneuvers with the risk of a collision with the vehicle indicating the wrong direction change.

To prevent that a driver forgets to turn off the direction indicator, he is warned by a warning light which often indicates also the side indicated by the indicator. Always aiming at preventing forgetting, a sound is coupled with the warning light when the direction indicator is turned on.

Two technical problems arise: the first one relates to the fact that looking at a warning light causes the driver to take his eyes off the road. This situation is clearly to be avoided since it distracts inevitably the driver, thus comprising the driving safety.

To such aim the acoustic warning can be relied on, which is turned on with the indicator. But unlike the warning light, such acoustic warning does not indicate the direction of the indicator turned on, and so it provides less information. So, to see the side the indicator is indicating the driver has inevitably to look at the warning light provided on the dashboard of the car, thus taking his eyes off the road. Moreover, if the driver while driving turns on music or the environmental noise is loud, there is yet the risk not to hear the signal of the direction indicator turned on. So, there persists the technical problem to warn the driver safely when the direction indicator is on.

At the state of the art, seat covers are known which are provided with vibrating warning systems connected to electronic control means which warn the driver about the turning on condition of the direction indicators. Devices of this type are described for example in EP 3439912 and US2008/128190.

Anyway, the devices described in such documents are not correctly adapted to the various drivers, who can have different body builds, and as a function of their own driving habits, can sit assuming various positions on the seat.

SUMMARY OF THE INVENTION

Aim of the present invention is to provide a car seat cover which overcomes the limits linked to the embodiments known at the state of the art.

The aim of warning the driver, without distracting him, about the direction indicator operating and about its relative side is reached by means of a device comprising the characteristics described in the main claim.

The dependent claims describe advantageous embodiments of the invention.

According to a first aim, the present invention provides a device configured to warn the driver that a direction indicator is on, without distracting him from driving.

According to another aim, the present invention provides a device configured to warn the driver about which of the direction indicators is turned on, whether the right one or the left one.

According to another aim, the present invention provides said warning system of the direction indicator turned on to be integrated in the car. According to another aim, the present invention provides a device, which in addition to providing an indication about the condition of the direction indicator, provides a functioning mode which by means of vibration can provide a massage to the driver thus making driving safer and more comfortable.

BRIEF DESCRIPTION OF THE DRAWINGS

The device will be now described with reference to the appended figures.

DETAILED DESCRIPTION

Figure 1:
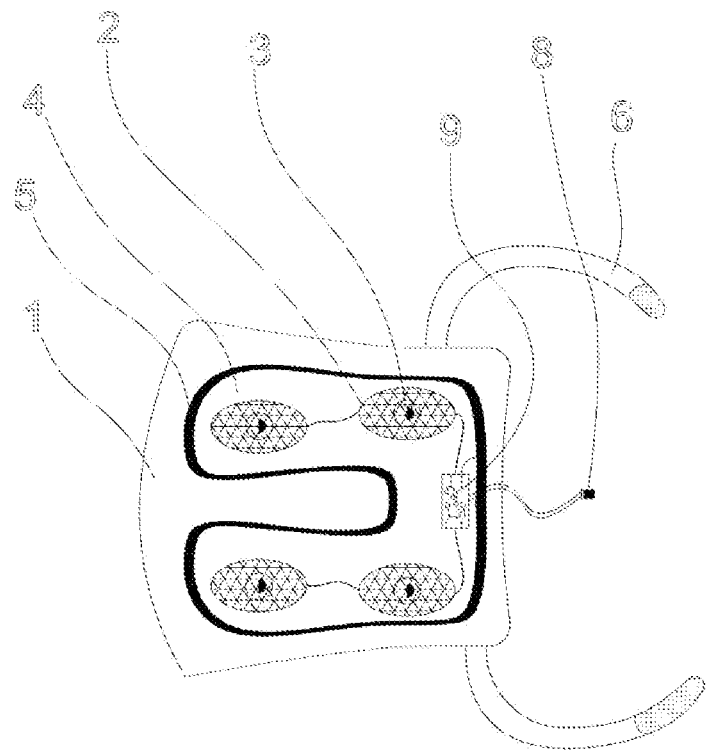
FIG. 1 shows a top view of the car seat cover device of the present invention with all its essential elements.
Figure 2:
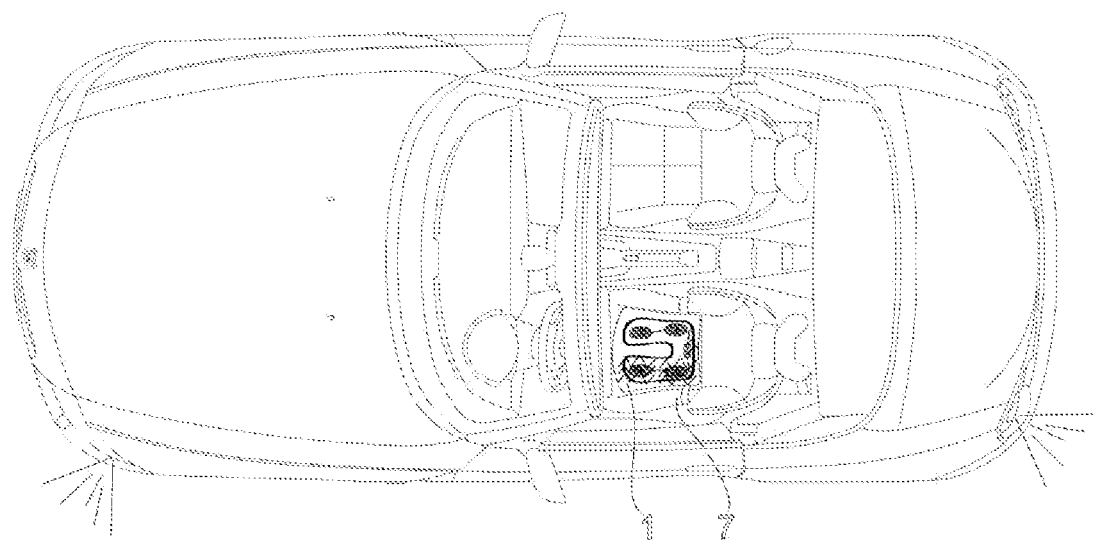
FIG. 2 shows a top view of the car seat cover device of the present invention mounted on the seat (7) of a car.

The present invention realizes the prefixed aims since it is a car seat cover device provided with vibrating warning system for signaling the direction indicators, comprising:
- a cover seat (1), which can be fixed by means of elastic bands (6) to the seat (7) of a car;
- a U-shaped support base (4), integral with the upper surface of said seat cover (1), with the U-shaped base arranged at the position of the driver's rachis;
- a plurality of flat bases (2), arranged on the right side and left side of the support base (4), each one of said flat bases (2) being provided with at least a vibrating motor (3), electrically connected to an electronic control unit (9);
- an electronic control unit (9) provided with a connector (8) allowing its connection to the car electric system and configured to be connected by means of the connector (8) to the vehicle control gearcase to receive by the vehicle gearcase the signal relating to the condition of the direction indicators of said car and to operate as a function of said signal the vibrating motors (3)

arranged on the right side if the direction indicator relating to the right side is on, the vibrating motors (3) arranged on the left side if the direction indicator relating to the left side is on, thus generating vibrations which are perceived by the driver sitting on the seat cover (1).

The electronic control unit (9) is also configured to turn off the vibrating motors when the direction indicator is turned off.

The vibrating motors (3) can be for example of eccentric mass type, and in another embodiment of the invention they can be integrated directly in the car seat.

A particular aspect of the present invention is that in order to operate only the vibrating motors (3) needed to warn the driver and to leave turned off the ones the driver is not sitting on, a plurality of pressure sensors (5) is provided on the upper surface of the support base (4), which pressure sensors are arranged on the U-shaped perimeter said support base (and are connected to the electronic control unit (9).

Each one of the pressure sensors (5) is configured to transmit to the electronic control unit (9) a signal indicating the presence or not of the driver weight on the corresponding position of the seat cover.

The control unit (9) is configured to receive the signals sent by said pressure sensors, to associate to each signal the position of the respective pressure sensor (5) and to activate, in case of activation of a direction indicator, only the vibrating motors (3) arranged at the respective pressure sensor.

Conveniently, the position of each pressure sensor (5) and the identification of the vibrating motors (3) arranged at each sensor are data stored in the electronic gearcase (9).

Preferably, the electronic control unit (9), by knowing the position of said pressure sensors (5) along the perimeter of said support base (4), will activate only the vibrating motors (3) arranged at a distance lower than 5 cm to the areas corresponding to the pressure sensors (5) which detect the pressure due to the driver, leaving turned off the vibrating motors (3) arranged at greater distances. Thanks to this measure, the system adapts oneself to the dimension and to the way the driver is sitting, and the vibration is distributed to the right side and left side only where it is needed.

Moreover, to improve the driving comfort, the support base (4) can be arranged on the lumbar support.

The U-shaped support base (4) can be coated outside with female Velcro and the plurality of flat bases (2) can be provided with a lower surface made by male Velcro which fixes the female Velcro to the base support (4), thus making said flat bases (2) repositionable on said support base (4). In this way, it is possible to adjust the position of the vibrating motors to the (3) according anthropometrical dimensions of the usual driver.

The electronic control unit (9) can activate the vibrating motors (3) also in a functioning mode of massaging type, thus providing useful information, but at the same time increasing the vehicle driving comfort. A seat heating system can be coupled to the massage by introducing for example electric resistances integrated in the flat bases (2).

Since the electronic control unit (9) is connected to the vehicle electronic gearcase, it can activate the vibrating motors (3) to signal other alarm information of the vehicle, which can be distinguished by the driver by intensity, position of the vibration and vibrational frequency.

The invention claimed is:

1. A car seat cover device provided with a vibrating warning system for signaling a condition of direction indicators, comprising:
   a seat cover;
   a support base integral with an upper surface of said seat cover;
   a plurality of flat bases arranged on right and left sides of said support base, each one of said flat bases being provided with at least one vibrating motor electrically connected to an electronic control unit; and
   an electronic control unit provided with a connector allowing connection of the electronic control unit to a car control unit, the electronic control unit being configured to receive by the car control unit a signal relating to the condition of the direction indicators, to operate as a function of said signal the vibrating motors associated to the flat bases arranged on a same side as an active direction indicator, thus generating vibrations perceivable by a driver sitting on said seat cover, wherein
   at a perimeter of an upper surface of said support base a plurality of pressure sensors is provided, which are connected to said electronic control unit and each one configured to transmit to said electronic control unit a signal indicating presence or not of weight of the driver on a corresponding position of the seat cover, and wherein
   said control unit is configured to receive the signals sent by said pressure sensors, to associate to each signal a position of a respective pressure sensor and to activate, in case of activation of a direction indicator, only the vibrating motors associated to the flat bases arranged at the same side as the active direction indicator and positioned at least at a pressure sensor detecting the presence of weight of the driver on the corresponding position of the seat cover.

2. The car seat cover device of claim 1, wherein said support base can be arranged on a lumbar support.

3. The car seat cover device of claim 1, wherein said support base is a U-shaped support base and, when the seat cover is positioned on a seat of a car, the U-shaped support base is arranged with a base of the U base at the position of the driver's rachis.

4. The car seat cover device of claim 3, wherein said U-shaped support base is coated outside with female Velcro, and wherein said flat bases are coated on a lower side with male Velcro, thus making said flat bases repositionable on said U-shaped support base.

5. The car seat cover device of claim 1, wherein said electronic control unit is configured to activate the vibrating motors in a massaging type functioning mode.

6. The car seat cover device of claim 1, wherein said electronic control unit is configured to activate the vibrating motors to signal other alarm information of a car, which can be distinguished by the driver by intensity, position of vibration and vibrational frequency.

7. The car seat cover device of claim 1, wherein the car seat cover device is fixable by elastic bands to a seat of a car.

* * * * *